US008116218B2

(12) United States Patent
Lv et al.

(10) Patent No.: US 8,116,218 B2
(45) Date of Patent: Feb. 14, 2012

(54) METHOD AND MODULE FOR ACQUIRING DIGITAL SUBSCRIBER LINE PARAMETER, AND LINE MANAGEMENT SYSTEM

(75) Inventors: Jie Lv, Shenzhen (CN); Ruzhou Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 929 days.

(21) Appl. No.: 12/126,180

(22) Filed: May 23, 2008

(65) Prior Publication Data

US 2008/0292021 A1   Nov. 27, 2008

(30) Foreign Application Priority Data

May 23, 2007   (CN) .......................... 2007 1 0107250

(51) Int. Cl.
*H04L 12/26* (2006.01)
(52) U.S. Cl. ........................................................ 370/252
(58) Field of Classification Search .................. 370/252, 370/253, 241
See application file for complete search history.

(56) References Cited

U.S. PATENT DOCUMENTS

| 7,302,379 | B2 * | 11/2007 | Cioffi et al. ............... 703/20 |
| 2004/0095921 | A1 * | 5/2004 | Kerpez ...................... 370/351 |
| 2006/0072722 | A1 * | 4/2006 | Savoor et al. ............. 379/93.05 |
| 2006/0198430 | A1 * | 9/2006 | Rhee et al. ................. 375/222 |
| 2008/0219290 | A1 * | 9/2008 | Cioffi et al. ................ 370/465 |
| 2010/0142601 | A1 * | 6/2010 | Flowers et al. ............. 375/222 |
| 2010/0166051 | A1 * | 7/2010 | Chung et al. ............... 375/225 |

FOREIGN PATENT DOCUMENTS

WO   WO-2007044326   4/2007

OTHER PUBLICATIONS

G.992.3-200501—Asymmetric digital subscriber line transceivers 2 (ADSL2), 2004.
Extended European Search Report dated Sep. 5, 2008.
XP-002442256 Technology White Paper. Dynamic Line Management for Digital Subscriber Lines—Maximizing Data Rates Maintaining Quality and Stabilty, 2005.
XP008081287 Technical Paper. Optimizing DSL for Multimedia Services—Line optimization can increase DSL speed, quality and stability while reducing operating expenses. Alcatel Telecommunications Review, 2nd Quarter 2005 pp. 155-159.
T-REC-G[1].997.1-200606—Physical layer management for digital subscriber line (DSL) transceivers, 2006.
T-REC-G.993.2-200602—Very high speed digital subscriber line transceivers 2 (VDSL2), 2006.
Chinese Office Action dated Jun. 8, 2011 regarding Application No. 200710107250.5.

\* cited by examiner

*Primary Examiner* — Gary Mui
(74) *Attorney, Agent, or Firm* — Harness, Dickey & Pierce, P.L.C.

(57) ABSTRACT

The present disclosure includes a method for acquiring DSL parameters, a module for acquiring Digital Subscriber Line (DSL) parameters, and a line management system. The method includes: obtaining the priority of a DSL; and acquiring parameters of the DSL in an acquisition period corresponding to the obtained priority, in accordance with a preset corresponding relationship between the priority of the DSL and the acquisition period. The system includes: a module for acquiring DSL parameters, configured to obtain the priority of a DSL and acquire parameters of the DSL in an acquisition period corresponding to the obtained priority in accordance with a preset corresponding relationship between the priority of the DSL and the acquisition period; a database configured to store the parameters acquired by the module for acquiring DSL parameters; a line management module configured to manage the DSL using the DSL parameters.

12 Claims, 3 Drawing Sheets

METHOD AND MODULE FOR ACQUIRING DIGITAL SUBSCRIBER LINE PARAMETER, AND LINE MANAGEMENT SYSTEM

CROSS-REFERENCE TO RELATED APPLICATIONS

This application claims the benefit of Chinese Application No. 200710107250.5, filed May 23, 2007. The disclosure of the above application is incorporated herein by reference.

FIELD

The present disclosure relates to a Digital Subscriber Line (DSL) technique, and particularly, to a method and a module for acquiring DSL parameters and a line management system.

BACKGROUND

The statements in this section merely provide background information related to the present disclosure and may not constitute prior art.

The Digital Subscriber Line (DSL) technique is a high speed transmission technique for transmitting data over twisted pair telephone lines (Unshielded Twist Pair (UTP) lines), including Asymmetrical Digital Subscriber Lines (ADSLs), Very-high-bit-rate Digital Subscriber Lines (VDSLs), Integrated Services Digital Network (ISDN) based Digital Subscriber Lines (IDSLs), etc., which are collectively referred to as xDSLs.

As the subscribers' demands for broadband services grow rapidly, DSLs increase dramatically in number and become more and more bulky. Therefore, line management and maintenance becomes more and more important.

FIG. 1 shows a typical XDSL management system, including:

a remote access device 110, usually a MODEM, generally configured to modulate/demodulate XDSL data signals to properly receive/transmit XDSL data, the remote access device 110 particularly including a remote XDSL transceiver unit (xTU-R) 111, a remote xTU management entity 112, and a remote management information base 113;

a central office access device 120, usually a DSL Access Multiplexer (DSLAM), generally configured to multiplex and de-multiplex xDSL data on various lines, the central office access device 120 particularly including a central office xDSL transceiver unit (xTU-C) 121, a central office xTU management entity 122, and a central office management information base 123;

a network management system 130, generally configured to manage the access devices, the network management system 130 typically interacting with the central office access device 120 through Simple Network Management Protocol (SNMP);

a Dynamic Line Management (DLM) system 140, generally responsible for DSL parameter acquisition, trouble shooting, etc;

In the above XDSL management system, the XDSL transceiver unit 111 in the remote access device 110 is connected to the XDSL transceiver unit 121 in the central office access device 120 via Digital Subscriber Lines 150, and the central office access device 120 is connected to a broadband network via a service network interface 160;

the DLM system 140 may acquire line parameters from the central office access device 120 directly or via the network management system 130.

In order to perform DSL maintenance in the above XDSL management system, it is necessary for the DLM system to acquire parameters from DSLs and evaluate DSL operation condition using the acquired parameters. In developing the present disclosure, the inventor found that there are some problems in the related art.

In particular, in existing DLM systems, DSL parameters are acquired from all DSLs at the same frequency, and thus, with low efficiency. In practical applications, the DSLs managed by the DLM systems differ greatly in operation condition. For example, some DSLs work relatively stably, while others work unstably. In the case that the parameters are acquired from all the DSLs at a relatively high frequency according to the related art, although the status of the DSLs may be ascertained and unstable DSLs may be maintained timely, due to the facts that the DLM systems manage a large number of DSLs (typically on the order of 1 million) and most of the DSLs work relatively stably and thus there is no need for frequent parameter acquisitions, enormous resource wasting may occur. If the parameters are acquired from all the DSLs at a relatively low frequency, unstable DSLs cannot be maintained timely and thus the effectiveness of DSL maintenance in the DSL systems may be degraded, although resource wasting may be reduced.

SUMMARY

In view of the above, the present disclosure provides a method and a module for acquiring DSL parameters and a line management system, thereby improving parameter acquisition efficiency and achieving optimal resource configuration.

In order to overcome the above problems, the present disclosure provides a technical scheme as follows.

A method for acquiring DSL parameters is provided, including:

obtaining a priority of a DSL;

acquiring parameters of the DSL in an acquisition period corresponding to the obtained priority in accordance with a preset corresponding relationship between the priority of the DSL and the acquisition period.

A module for acquiring DSL parameters includes the following:

a priority obtaining unit, configured to obtain a priority of a DSL;

a parameter acquisition unit, configured to acquire parameters of the DSL in an acquisition period corresponding to the obtained priority, in accordance with a preset corresponding relationship between the priority of the DSL and the acquisition period.

A line management system includes the following:

a module for acquiring DSL parameters, configured to obtain a priority of a DSL and acquire parameters of the DSL in an acquisition period corresponding to the obtained priority, in accordance with the preset corresponding relationship between the priority of the DSL and the acquisition period;

a database configured to store the parameters acquired by the module for acquiring DSL parameters;

a line management module configured to manage the DSL in accordance with the parameters.

It can be seen from above technical scheme that, in the present disclosure, parameters of a DSL are acquired in an acquisition period corresponding to the priority of the DSL in accordance with a preset corresponding relationship between the priority of the DSL and the acquisition period, and therefore the acquisition periods for the DSLs may be optimally configured in accordance with the priorities of the DSLs. As a result, compared to the prior art method in which parameters are acquired from all DSLs at the same frequency, the present disclosure may achieve improved parameter acquisition efficiency and optimal resource configuration.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Various embodiments of a method and a module for acquiring DSL parameters and a line management system as provided by the present disclosure will be described hereinafter with reference to the accompanying drawings.

Figure 1:
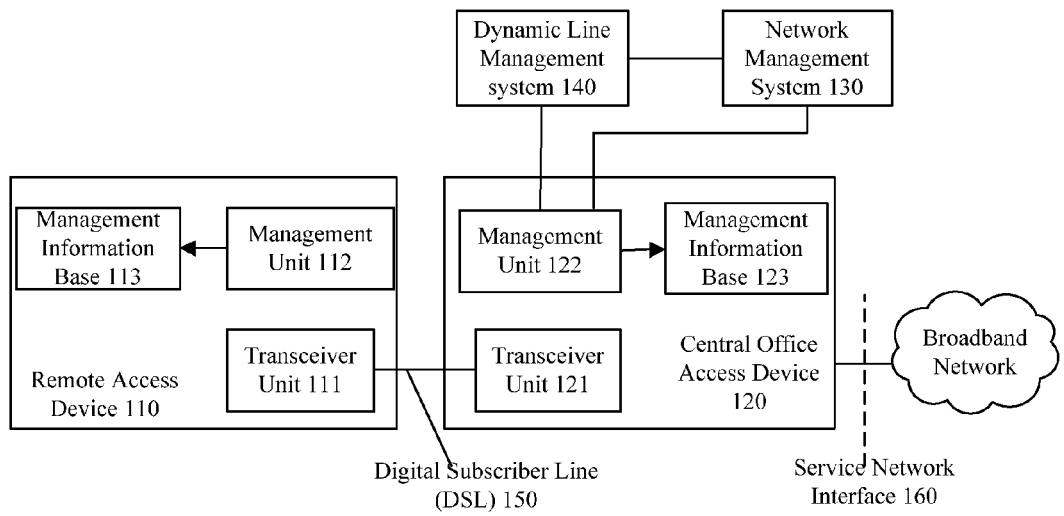
FIG. 1 is a structural diagram of an XDSL management system according to the related art.
Figure 2:
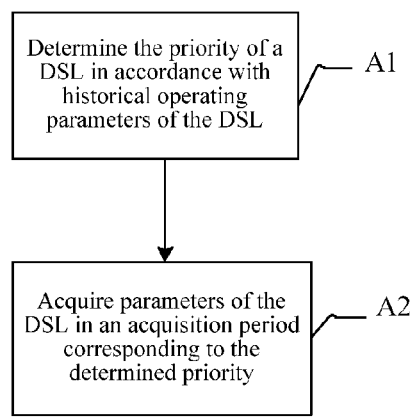
FIG. 2 is a flow diagram of a first embodiment of a method for acquiring DSL parameters according to the present disclosure.

Embodiment 1: a method for acquiring DSL parameters, as shown in FIG. 2, including:

A1. determining the priority of the DSL in accordance with historical operation parameters of the DSL;

In a DLM system, the DSLs are managed and maintained generally in accordance with their operation parameters. The following table provides some examples of the operation parameters:

TABLE 1

| Parameter Acronym | Parameter Meaning |
| --- | --- |
| Actual data rate | Actual active data rate |
| Actual user data rate | Actual user service data rate, i.e., the rate of data from/to an xTU interface |
| Actual interleaving delay | Actual active interleaving time delay |
| Actual INP | Actual Impulse Noise Protection |
| LATN | Line Attenuation |
| SATN | Signal Attenuation |
| SNRM | signal-to-noise Ratio Margin |
| ATTNDR | Attainable Data Rate |
| ACTATP | Actual Aggregate Transmit Power |
| BITSps | Bits Per Sub-channel |
| SNRps | SNR Per Sub-channel |
| FECS | Forward Error Correction (FEC) Second |
| LOSS | Loss of Signal Second |
| LOFS | Loss of Frame Second |
| LOLS | Loss of Link Second |
| ES | Error Second |
| SES | Severely Errored Second |
| UAS | Unavailable Second |
| LPRS | Loss of Power Second |

TABLE 1-continued

| Parameter Acronym | Parameter Meaning |
| --- | --- |
| Sync Success Count | Synchronization Success Count, acronym: SSC |
| Sync Fail Count | Synchronization Fail Count, acronym: SFC |
| CorrectedBlks | the count of blocks in which the errors have been corrected with FEC coding/decoding |
| UncorrectBlks | the count of blocks in which the errors cannot be corrected with FEC coding/decoding |

The main purpose of line management for the DLM system is to optimize the lines, and to find and fix line faults before users raise complaints, thereby improving user satisfaction. The major factors affecting user satisfaction include low actual data rate, loss of line, and code error. Low actual data rate largely arises from the lines and therefore there is a need to check the physical conditions of the lines, which will not be discussed here. Loss of line may cause service interruption, and code error may cause reduced access rate and mosaic in network video, etc. Therefore, the operation parameters relating to loss of line and code error may be taken as the basis for line priority determination.

In the above Table 1, the operation parameters relating to code error include ES, SES, UAS, and UncorrectBlks, and the operation parameters relating to loss of line include LOLS, SSC, and SFC. In addition, persistent low STNM may also cause loss of line. Therefore, the operation parameters relating to loss of line may also include SNRM.

The priority of a DSL may be determined using the above operation parameters. Exemplary methods for determining line priority respectively using ES and SNRM will be described below. In the exemplary methods, the line priority is classified into Level 3, Level 2, and Level 1. A higher level value indicates higher priority and higher demand for line parameter acquisition.

1. Determining Line Priority Using ES

ES refers to the count of seconds during which one or more CRC errors occur, and a high count value indicates poorer line condition. The following method may be used to determine line priority using ES:

A111. obtaining the ES of a DSL;

The ES is determined using N ESi (i=1, 2, ..., N), where ESi represents the ith ES value as acquired, and N may be determined as required;

The ES may be determined by either of the following two methods:

1) taking the maximum among N ESi (i=1, 2, ..., N);

That is to say, the ES may be determined from expression (1)

$$ES = \text{Max}\{ES1, ES2 \ldots ESN\} \quad (1)$$

2) calculating the ES by weighting ESi (i=1, 2, ..., N);

The latest acquired ES may be provided with the highest weight, and the earliest acquired ES may be provided with the lowest weight. Specifically, the ES may be determined from expression 2):

$$ES = \sum_{i=1}^{N} \frac{1}{2^i} ESi + \frac{1}{2^N} ESN \quad (2)$$

A112. determining line priority from expression (3), using the obtained ES:

$$Priority = \begin{cases} 3 & \text{if } ES > ES_H \\ 2 & \text{if } ES_L \leq ES \leq ES_H \\ 1 & \text{if } ES < ES_L \end{cases} \quad (3)$$

where Priority represents line priority, and ESH and ESL are preset thresholds;

In this way, one exemplary method for determining line priority using ES has been provided. The methods for determining line priority respectively using SES, UAS, UncorrectBlks, LOLS, SSC, or SFC are similar to this exemplary method and therefore will not be described here.

2. Determining Line Priority Using SNRM

SNRM represents signal-to-noise margin. In contrast to ES, a lower SNRM indicates a poorer line condition. The following method may be used to determine line priority using SNRM:

A121. obtaining the SNRM of the DSL;

SNRM is determined using N SNRMi (i=1, 2, . . . , N), where SNRMi represents the ith SNRM value as acquired and N may be determined as required;

The SNRM may be determined by either of the following two methods:

a) taking the minimum among N SNRMi (i=1, 2, . . . , N);

That is to say, the SNRM may be determined from expression (4):

$$SNRM = Min\{SNRM1, SNRM2 \ldots SNRMN\} \quad (4)$$

b) calculating the SNRM by weighting SNRMi (i=1, 2, . . . , N);

The latest acquired SNRM may be provided with the highest weight, and the earliest acquired SNRM may be provided with the lowest weight. Specifically, the SNRM may be determined from expression 5):

$$SNRM = \sum_{i=1}^{N} \frac{1}{2^i} SNRMi + \frac{1}{2^N} SNRMN \quad (5)$$

A122. determining line priority from expression (6), using the obtained SNRM:

$$Priority = \begin{cases} 1 & \text{if } SNRM > SNRM_H \\ 2 & \text{if } SNRM_L \leq SNRM \leq SNRM_H \\ 3 & \text{if } SNRM < SNRM_L \end{cases} \quad (6)$$

where Priority represents line priority, and SNRMH and SNRML are preset thresholds.

Furthermore, an optional method for determining the priority of the DSL using multiple operation parameters is: determining, using multiple operation parameters, corresponding line priorities, obtaining the highest priority among the priorities, and taking the highest priority as the priority of the DSL.

A2. acquiring parameters of the DSL in an acquisition period corresponding to the predetermined priority, in accordance with a preset corresponding relationship between the priority of the DSL and the acquisition period.

The following Table 2 shows an example of the corresponding relationship between the priority of the DSL and the acquisition period:

TABLE 2

| | Priority Level | | |
| --- | --- | --- | --- |
| | 3 | 2 | 1 |
| Acquisition Period | 15 min. | 1 day | 1 week |

With the above corresponding relationship, if the line priority is determined as 3, the parameters will be acquired from the DSL once every 15 min.; if the line priority is determined as 2, the parameters will be acquired from the DSL once a day; and if the line priority is determined as 1, the parameters will be acquired from the DSL once a week. The acquired parameters include a part or all of the parameters shown in Table 1.

The parameters of the DSL may be acquired directly from a central office access device or from the central office access device via the network management system.

The present disclosure further provides a second embodiment of the method for acquiring DSL parameters. In this embodiment, the DSL priority is determined using service information registered by the DSL, which includes Service Type and Service Bandwidth, etc. The method will be described below.

B1. determining the priority of a DSL using service information registered by the DSL, the service information including Service Type, Service Bandwidth, etc.

In XDSL services, different types of services require different line quality levels (e.g., enterprise access requires relatively high line quality, while subscriber access requires relatively low line quality). Likewise, different service bandwidths require different line quality levels (for example, if the bandwidth registered by the line is relatively high, the transmission of high data rate services, e.g., network video service, may be required on the line, and therefore the requirement for line quality will be relatively high; and if the bandwidth registered by the line is relatively low, for example, the transmission of normal services, e.g., webpage browsing or email sending/receiving, is required on the line, and therefore the requirement for line quality will be relatively low). Accordingly, the line priority may be determined using Service Type and/or Service Bandwidth registered by the DSL.

When the line priority is determined using only the Service Type (or Service Bandwidth), the line priority may be obtained directly from a preset corresponding relationship between the Service Type (or Service Bandwidth) and the line priority.

If the line priority is determined using the Service Type and Service Bandwidth, the line priority may be calculated by the following weighting method:

B11. obtaining the Service Type and Service Bandwidth registered by the DSL;

B12. obtaining the point-values of Service Type and Service Bandwidth respectively in accordance with a preset corresponding relationship between the Service Type and a point-value and a preset corresponding relationship between the Service Bandwidth and the point-value;

B13. calculating an overall point-value by providing the obtained Service Type and Service Bandwidth with preset weights;

B14. obtaining the priority of the DSL in accordance with a preset corresponding relationship between an overall point-value and a line priority;

B2. acquiring parameters of the DSL in a predetermined acquisition period corresponding to the priority, in accordance with the preset corresponding relationship.

The parameters of the DSL may be acquired directly from a central office access device or from the central office access device via the network management system.

The present disclosure further provides a third embodiment of the method for acquiring DSL parameters. In this embodiment, the DSL priority is determined using the historical operation parameters of the DSL and service information registered by the DSL as follows:

C1. determining the priority of the DSL in accordance with service information registered by the DSL and historical operation parameters of the DSL;

An exemplary method for determining DSL priority using service information registered by the DSL and the historical operation parameters of the DSL will be described below in the case of ES. The DSL priority is again classified into Level 3, Level 2, and Level 1. A higher level value indicates higher priority and higher demand for line parameter acquisition. The exemplary method includes the following steps:

C11. obtaining the importance level of the DSL in accordance with service information registered by the DSL;

The DSL importance level is also classified into Level 3, Level 2, and Level 1. A higher level indicates a more important DSL. The DSL importance level may be obtained by the method for determining DSL priority in embodiment 2, and therefore will not be described here for the sake of simplicity;

C12. obtaining the threshold values $ES_H'$ and $ES_L'$ corresponding to the line importance level obtained in C111) in accordance with a preset corresponding relationship between the line importance level and thresholds;

In the preset corresponding relationship between the line importance level and thresholds, three different sets of thresholds are defined corresponding to the three line importance levels. The higher the level is, the lower the corresponding thresholds will be (as shown in Table 3), so that a DSL with higher importance level may obtain higher priority more easily;

TABLE 3

| | Line Importance Level | | |
|---|---|---|---|
| | 3 | 2 | 1 |
| $ES'_H$ | $ES_H/4$ | $ES_H/2$ | $ES_H$ |
| $ES'_L$ | $ES_L/4$ | $ES_L/2$ | $ES_L$ |

C13. obtaining the ES of the DSL;

The ES may be obtained by the method for obtaining the ES of the DSL as described in embodiment 1, and therefore will not be described here for the sake of simplicity.

C14. determining the priority of the DSL from expression (7), in accordance with the obtained ES and the thresholds $ES_H'$ and $ES_L'$;

$$\text{Priority} = \begin{cases} 3 & \text{if } ES > ES'_H \\ 2 & \text{if } ES'_L \le ES \le ES'_H \\ 1 & \text{if } ES < ES'_L \end{cases} \quad (7)$$

C2. acquiring parameters of the DSL in the predetermined acquisition period corresponding to the priority, in accordance with the preset corresponding relationship.

The parameters of the DSL may be acquired directly from a central office access device or from the central office access device via the network management system.

Figure 3:
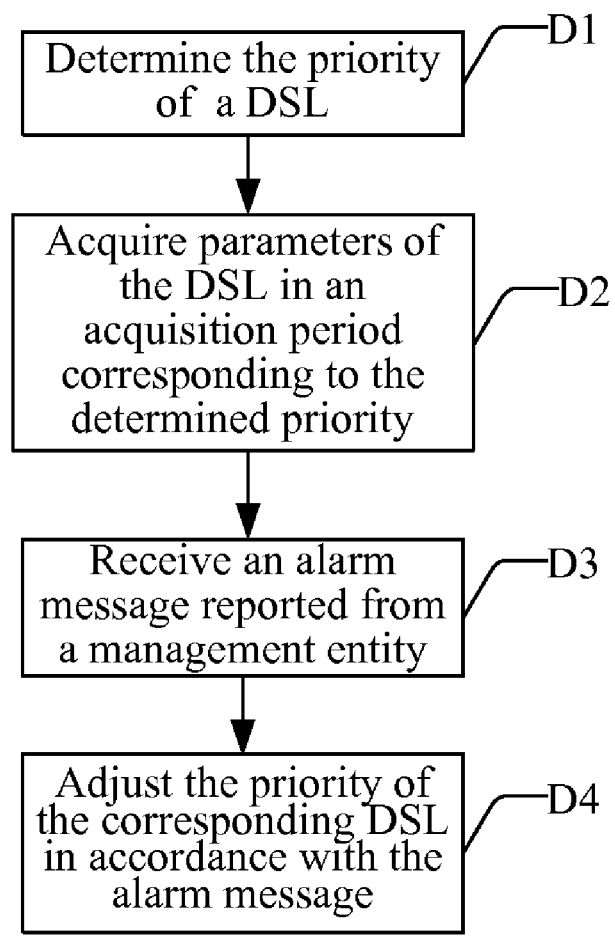
FIG. 3 is a flow diagram of a fourth embodiment of the method for acquiring DSL parameters according to the present disclosure.

The present disclosure further provides a fourth embodiment of the method for acquiring DSL parameters. In this embodiment, as shown in FIG. 3, after having been determined, the priority of the DSL may be adjusted in accordance with an alarm message sent from an xTU management entity as follows:

D1. determining the priority of the DSL;

The priority of the DSL may be determined using historical operation parameters of the DSL and/or service information registered by the DSL, by the method as described in the above various embodiments.

D2. acquiring parameters of the DSL in a predetermined acquisition period corresponding to the priority, in accordance with a preset corresponding relationship between the priority of the DSL and the acquisition period;

The parameters of the DSL may be acquired directly from a central office access device or from the central office access device via the network management system.

D3. receiving the alarm message reported by the xTU management entity;

The xTU management entity may be configured to monitor one or more operation parameters of the DSL, and send an alarm message to the DLM system if any parameter exceeds the preset threshold. The alarm message may carry the ID of the parameter that exceeds the preset threshold;

The xTU management entity may be a management entity for the central office access device or a management entity for the remote access device.

The DLM system may receive the alarm message via the central office access device or the network management system.

D4. adjusting the priority of the DSL in accordance with the alarm message.

After receiving the alarm message, the DLM system may increase the priority of the DSL directly, or acquire parameters of the DSL immediately and then adjust the priority of the DSL in accordance with the acquired parameters.

It can be seen from the above technical scheme that, in the present disclosure, parameters of a DSL are acquired in an acquisition period corresponding to the priority of the DSL in accordance with a preset corresponding relationship between the priority of the DSL and the acquisition period, and therefore the acquisition periods for the DSLs may be optimally configured in accordance with the priorities of the DSLs. As a result, compared to the prior art method in which parameters are acquired from all DSLs at the same frequency, the present disclosure may achieve improved parameter acquisition efficiency and optimal resource configuration.

Those skilled in the art will appreciate that all or a part of the steps of the methods in the various embodiments may be implemented by instructing relevant hardware to execute a program that may be stored in readable storage medium in a computer. The program, when executed, may include the following steps: obtaining the priority of a DSL; and acquiring parameters of the DSL in an acquisition period corresponding to the obtained priority, in accordance with a preset corresponding relationship between the priority of the DSL and the acquisition period. The storage medium described here may be ROM/RAM, magnetic disk, optical disk, etc.

Figure 4:
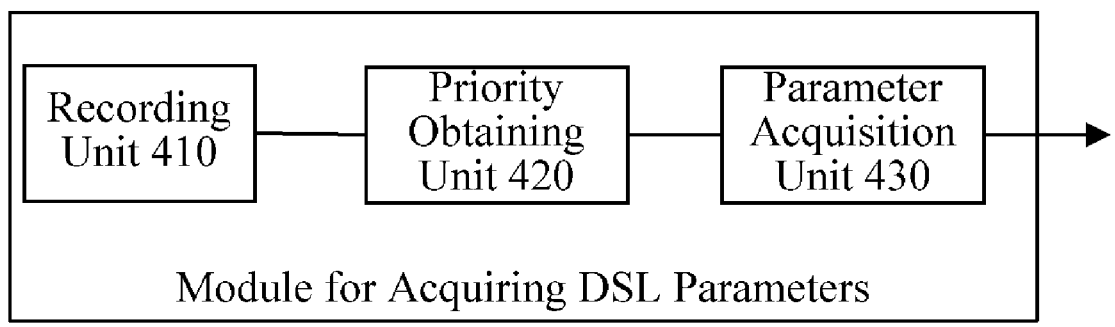
FIG. 4 is a structural diagram of an embodiment of a module for acquiring DSL parameters according to the present disclosure.

FIG. 4 shows a structural diagram of an embodiment of a module for acquiring DSL parameters provided the present disclosure. The module for acquiring DSL parameters includes a recording unit 410, a priority obtaining unit 420, and a parameter acquisition unit 430.

The recording unit 410 is configured to record historical operation parameters of a DSL and/or service information registered by the DSL.

The operation parameters may be one or more of the group including ES, SES, UAS, UncorrectBlks, LOLS, SSC, SFC, and SNRM.

The priority obtaining unit 420 is configured to obtain the priority of the DSL in accordance with the historical operation parameters and/or the service information.

The parameter acquisition unit is configured to acquire the parameters of the DSL in an acquisition period corresponding to the obtained priority, in accordance with a preset corresponding relationship between the priority of the DSL and the acquisition period.

In various embodiments of the module for acquiring DSL parameters provided in the present disclosure, the module for acquiring DSL parameters further includes a receiving unit and a priority adjusting unit, the receiving unit being configured to receive an alarm message reported by an xTU management entity, the priority adjusting unit being configured to adjust the priority of the DSL in accordance with the alarm message.

It is noted that the various embodiments of the module for acquiring DSL parameters in the present disclosure may be implemented in the form of hardware or a software function module, and may be sold or used as a separate product or stored in readable storage medium in a computer.

Figure 5:
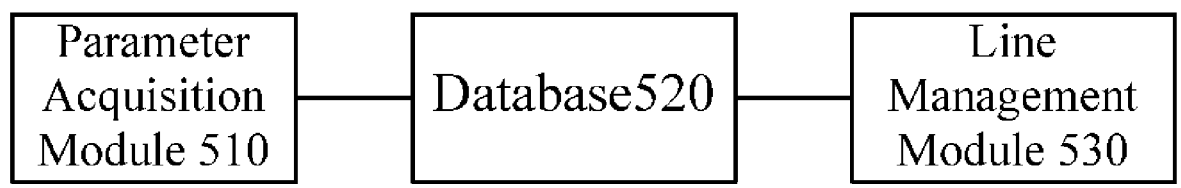
FIG. 5 is a structural diagram of an embodiment of a line management system according to the present disclosure.

FIG. 5 shows a structural diagram of a line management system provided in the present disclosure. The line management system includes a module 510 for acquiring DSL parameters, a database 520, and a line management module 530.

The module 510 for acquiring DSL parameters is configured to obtain the priority of the DSL and acquire parameters of the DSL in an acquisition period corresponding to the obtained priority. The module for acquiring DSL parameters as described in any of the various embodiments may be used in actual implementations.

The database 520 is configured to store the DSL parameters acquired by the module 510 for acquiring DSL parameters.

The line management module 530 is configured to manage the DSL in accordance with the DSL parameters, for example, by performing DSL optimization, monitoring, trouble diagnosis, failure analysis, and/or troubleshooting, etc.

In various embodiments of the line management system provided in the present disclosure, the module for acquiring DSL parameters further includes a receiving unit and a priority adjusting unit, the receiving unit being configured to receive an alarm message reported by an xTU management entity, the priority adjusting unit being configured to adjust the priority of the DSL in accordance with the alarm message.

In summary, in the present disclosure, parameters of a DSL are acquired in an acquisition period corresponding to the priority of the DSL in accordance with a preset corresponding relationship between the priority of the DSL and the acquisition period, and therefore the acquisition periods for the DSLs may be optimally configured in accordance with the priorities of the DSLs. As a result, compared to the prior art method in which parameters are acquired from all DSLs at the same frequency, the present disclosure may achieve improved parameter acquisition efficiency and optimal resource configuration.

While the present disclosure has been illustrated and described with reference to some preferred various embodiments, the present disclosure is not limited to these. Those skilled in the art should recognize that various variations and modifications may be made without departing from the spirit and scope of the present disclosure as defined by the accompanying claims.

What is claimed is:

1. A method for acquiring Digital Subscriber Line (DSL) parameters, comprising:
    obtaining a priority of a DSL, wherein the priority indicates demand class for line parameter acquisition;
    acquiring parameters of the DSL in an acquisition period corresponding to the obtained priority in accordance with a preset corresponding relationship between a priority of the DSL and a period.

2. The method for acquiring DSL parameters according to claim 1, wherein the obtaining of the priority of the DSL is performed in accordance with historical operation parameters of the DSL and/or service information registered by the DSL.

3. The method for acquiring DSL parameters according to claim 2, wherein the operation parameters are one or more of the group including: Error Second (ES), Severely Errored Second (SES), Unavailable Second (UAS), Uncorrect Blocks (UncorrectBlks), Loss of Link Second (LOLS), Synchronization Success Count (SSC), Synchronization Fail Count (SFC), and Signal-to-Noise Ratio Margin (SNRM).

4. The method for acquiring DSL parameters according to claim 3, further comprising:
    receiving, by an xDSL transceiver unit, an alarm message reported by an xTU management entity, after the acquiring parameters of the DSL; and
    adjusting the priority of the DSL in accordance with the alarm message.

5. The method for acquiring DSL parameters according to claim 1, further comprising:
    receiving, by an xDSL transceiver unit, an alarm message reported by an xTU management entity, after the acquiring parameters of the DSL; and
    adjusting the priority of the DSL in accordance with the alarm message.

6. The method for acquiring DSL parameters according to claim 1, further comprising:
    receiving an alarm message reported by an xTU management entity, after the acquiring parameters of the DSL; and
    adjusting the priority of the DSL in accordance with the alarm message.

7. A module for acquiring DSL parameters, comprising:
    a priority obtaining unit, configured to obtain a priority of a DSL;
    a parameter acquisition unit, configured to acquire parameters of the DSL in an acquisition period corresponding to the obtained priority, in accordance with a preset corresponding relationship between the priority of the DSL and the acquisition period.

8. The module for acquiring DSL parameters according to claim 7, wherein,
    the module for acquiring DSL parameters further comprises a recording unit configured to record historical operation parameters of the DSL and/or service information registered by the DSL; and the priority obtaining unit is configured to obtain the priority of the DSL in accordance with the historical operation parameters and/or the service information.

9. The module for acquiring DSL parameters according to claim 8, wherein the module for acquiring DSL parameters further comprises:
a receiving unit, configured to receive an alarm message reported by an xTU management entity;
a priority adjusting unit, configured to adjust the priority of the DSL in accordance with the alarm message.

10. A line management system, comprising:
a module for acquiring DSL parameters, configured to obtain a priority of a DSL and acquire parameters of the DSL in an acquisition period corresponding to a obtained priority, in accordance with a preset corresponding relationship between the priority of the DSL and the acquisition period;
a database configured to store the parameters acquired by the module for acquiring DSL parameters;
a line management module configured to manage the DSL in accordance with the parameters.

11. The line management system according to claim 10, wherein the module for acquiring DSL parameters comprises:
a recording unit, configured to record the historical operation parameters of the DSL and/or service information registered by the DSL;
a priority obtaining unit, configured to obtain the priority of the DSL in accordance with the historical operation parameters and/or the service information of the DSL;
a parameter acquisition unit, configured to acquire parameters of the DSL in an acquisition period corresponding to the obtained priority, in accordance with a preset corresponding relationship between the priority of the DSL and the acquisition period.

12. The line management system according to claim 11, wherein the module for acquiring DSL parameters further comprises:
a receiving unit, configured to receive an alarm message reported by an xTU management entity;
a priority adjusting unit, configured to adjust the priority of the DSL in accordance with the alarm message.

* * * * *